United States Patent
Seo et al.

(10) Patent No.: US 8,932,688 B2
(45) Date of Patent: Jan. 13, 2015

(54) POLARIZING PLATE AND LIQUID CRYSTAL DISPLAY INCLUDING THE SAME

(71) Applicants: Eun Kyeong Seo, Uiwang-si (KR); Dong Yoon Shin, Uiwang-si (KR); Ae Kyoung Kim, Uiwang-si (KR); A Ra Jo, Uiwang-si (KR); So Hee Yu, Uiwang-si (KR); Il Woong Baek, Uiwang-si (KR); Min Jung Kim, Uiwang-si (KR); Hae Ryong Chung, Uiwang-si (KR)

(72) Inventors: Eun Kyeong Seo, Uiwang-si (KR); Dong Yoon Shin, Uiwang-si (KR); Ae Kyoung Kim, Uiwang-si (KR); A Ra Jo, Uiwang-si (KR); So Hee Yu, Uiwang-si (KR); Il Woong Baek, Uiwang-si (KR); Min Jung Kim, Uiwang-si (KR); Hae Ryong Chung, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 0 days.

(21) Appl. No.: 13/721,680

(22) Filed: Dec. 20, 2012

(65) Prior Publication Data

US 2013/0162935 A1   Jun. 27, 2013

(30) Foreign Application Priority Data

Dec. 21, 2011   (KR) .................. 10-2011-0139591

(51) Int. Cl.
 *B32B 7/12*   (2006.01)
 *G02B 5/30*   (2006.01)
 *C09J 129/04*   (2006.01)
 *G02F 1/1335*   (2006.01)
 *B32B 27/30*   (2006.01)

(52) U.S. Cl.
 CPC ............. *G02B 5/3025* (2013.01); *C09J 129/04* (2013.01); *G02F 1/133533* (2013.01); *B32B 27/30* (2013.01)

USPC ............... 428/1.5; 428/1.31; 428/355 EN; 349/96; 349/122

(58) Field of Classification Search
 CPC .. C09J 129/04; G02F 1/133533; B32B 27/30; G02B 5/3025
 USPC ........ 428/1.3–1.33, 1.5, 1.55, 355 R, 355 EN, 428/355 CN; 349/96, 122
 See application file for complete search history.

(56) References Cited

FOREIGN PATENT DOCUMENTS

| JP | 2001116922 | * | 4/2001 | ............... G02B 5/30 |
| KR | 10-2008-0050398 A | | 6/2008 | |
| KR | 10-2009-0049382 | * | 5/2009 | |
| KR | 10-2009-0049382 A | | 5/2009 | |
| KR | 200949382 | * | 5/2009 | ............. C09J 129/04 |

OTHER PUBLICATIONS

Korean Office action dated Mar. 24, 2014 for Korean Application No. 10-2011-0139591; Eun Kyeong Seo, et al.

* cited by examiner

*Primary Examiner* — Sophie Hon
(74) *Attorney, Agent, or Firm* — Lee & Morse, P.C.

(57) ABSTRACT

A polarizing plate includes a polarizer; and a protective film attached to at least one side of the polarizer via an adhesive layer. The adhesive layer is formed of a water-based adhesive including a polyvinyl alcohol resin, a zirconium compound, and an imine crosslinking agent. The polarizing plate has a variation in light transmittance (|B−A|) from 0% to about 0.25% at wavelengths from 400 nm to 780 nm, where A is an average value of initial light transmittance of the polarizing plate at wavelengths from 400 nm to 780 nm, and B is an average value of light transmittance of the polarizing plate at wavelengths from 400 nm to 780 nm measured after the polarizing plate has been dipped in water of 25° C. for 3 hours, followed by drying at 25° C. for 2 hours.

8 Claims, 1 Drawing Sheet

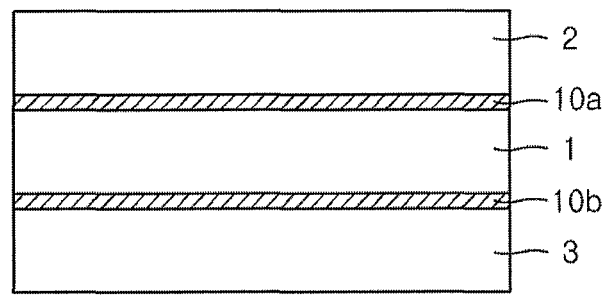

POLARIZING PLATE AND LIQUID CRYSTAL DISPLAY INCLUDING THE SAME

CROSS-REFERENCE TO RELATED APPLICATION

The present application claims priority under 35 U.S.C. §119 to Korean Patent Application No. 10-2011-0139591 filed on Dec. 21, 2011, in the Korean Intellectual Property Office, and entitled: "POLARIZING PLATE AND LIQUID CRYSTAL DISPLAY INCLUDING THE SAME," which is incorporated by reference herein in its entirety.

BACKGROUND

1. Field

Embodiments relate to a polarizing plate and a liquid crystal display (LCD) including the same.

2. Description of the Related Art

Polarizing plates are placed on both sides of a liquid crystal cell to control the oscillation of light in order to provide a display pattern of a liquid crystal display. Applications of liquid crystal displays have continuously expanded from small devices of an initial stage to notebook computers, LCD monitors, LCD color projectors, LCD televisions, car navigation systems, personal phones, outdoor/indoor measurement instruments, and the like.

SUMMARY

Embodiments are directed to a polarizing plate including a polarizer, and a protective film attached to at least one side of the polarizer via an adhesive layer. The adhesive layer is formed of a water-based adhesive including a polyvinyl alcohol resin, a zirconium compound, and an imine crosslinking agent. The polarizing plate has a variation in light transmittance (|B−A|) from 0% to about 0.25% at wavelengths from 400 nm to 780 nm, where A is an average value of initial light transmittance of the polarizing plate at wavelengths from 400 nm to 780 nm, and B is an average value of light transmittance of the polarizing plate at wavelengths from 400 nm to 780 nm measured after the polarizing plate has been dipped in water of 25° C. for 3 hours, followed by drying at 25° C. for 2 hours.

The polarizing plate may have a variation in a degree of polarization (D−C) from more than about −0.001% to about 0% at wavelengths from 400 nm to 780 nm, where C is an average value of initial degrees of polarization of the polarizing plate at wavelengths from 400 nm to 780 nm, and D is an average value of degrees of polarization of the polarizing plate at wavelengths from 400 nm to 780 nm measured after the polarizing plate has been dipped in water of 25° C. for 3 hours, followed by drying at 25° C. for 2 hours.

The water-based adhesive may have a viscosity of about 15 cP to about 25 cP at 25° C.

The zirconium compound may be present in the water-based adhesive in an amount of about 1 part by weight to about 40 parts by weight based on 100 parts by weight of the polyvinyl alcohol resin.

The imine crosslinking agent may be present in the water-based adhesive in an amount of about 10 parts by weight to about 50 parts by weight based on 100 parts by weight of the polyvinyl alcohol resin.

A weight ratio of the zirconium compound to the imine crosslinking agent in the water-based adhesive may range from about 0.1 to about 1.0.

The zirconium compound may include at least one selected from the group of zirconium oxide, ammonium zirconium carbonate, zirconium acetylacetonate, zirconium acetate, zirconium carbonate, zirconium sulfate, zirconium phosphate, potassium zirconium carbonate, zirconium sodium phosphate, sodium zirconium tartrate, zirconium nitrate, and chlorohydroxyoxozirconium.

The imine crosslinking agent may be polyethylene imine.

The polyvinyl alcohol resin may be present in the water-based adhesive in an amount of about 1 part by weight to about 10 parts by weight based on 100 parts by weight of water in the water-based adhesive.

The protective film may include at least one selected from the group of cellulose, polyester, cyclic polyolefin, polycarbonate, polyethersulfone, polysulfone, polyamide, polyimide, polyolefin, polyarylate, polyvinyl alcohol, polyvinyl chloride, and polyvinylidene chloride.

The polarizer may have a thickness of about 15 μm to about 30 μm. The protective film has a thickness of about 10 μm to about 100 μm. The adhesive layer may have a thickness of about 1 μm or less.

A liquid crystal display may include the polarizing plate.

BRIEF DESCRIPTION OF THE DRAWINGS

Features will become apparent to those of ordinary skill in the art by describing in detail exemplary embodiments with reference to the attached drawings in which:

FIG. 1 illustrates a cross-sectional view of a polarizing plate according to an embodiment.

DETAILED DESCRIPTION

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figure, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present.

According to an embodiment, a polarizing plate may have reduced variation in optical characteristics such as light transmittance and/or degree of polarization, in a dipping test. Thereby, such a polarizing plate may provide excellent optical characteristics and high durability and resistance in hot and humid conditions.

The polarizing plate may have reduced variation in light transmittance in a dipping test. Specifically, the polarizing plate may have a variation in light transmittance (|B−A|) from 0% to about 0.25% at wavelengths from 400 nm to 780 nm, where A is an average value of initial light transmittance of the polarizing plate at wavelengths from 400 nm to 780 nm, and B is an average value of light transmittance of the polarizing plate at wavelengths from 400 nm to 780 nm measured after the polarizing plate has been dipped in water of 25° C. for 3 hours, followed by drying at 25° C. for 2 hours. Within this range of variation of light transmittance, the polarizing plate may have excellent properties in terms of durability and resistance in hot and humid conditions and may have excellent optical characteristics. As an example, the polarizing plate may have a variation in light transmittance (|B−A|) from 0% to about 0.21%.

The average values A and B of the light transmittance may be calculated, for example, by averaging values of light transmittance that are measured at regular wavelength intervals of about 2 nm at wavelengths from 400 nm to 780 nm.

The term "light transmittance" refers to a fraction of incident light that passes through a polarizing plate, at a specified wavelength e.g. from 400 nm to 780 nm.

The polarizing plate may have reduced variation in a degree of polarization in a dipping test. Specifically, the polarizing plate may have a variation in degree of polarization (D−C) from more than about −0.001% to about 0% at wavelengths from 400 nm to 780 nm, where C is an average value of initial degrees of polarization of the polarizing plate at wavelengths from 400 nm to 780 nm, and D is an average value of degrees of polarization of the polarizing plate at wavelengths from 400 nm to 780 nm measured after the polarizing plate has been dipped in water of 25° C. for 3 hours, followed by drying at 25° C. for 2 hours. Within this range of variation of a degree of polarization, the polarizing plate may have excellent properties in terms of durability and resistance in hot and humid conditions and may have excellent optical characteristics. As an example, the polarizing plate may have a variation in a degree of polarization (D−C) from about −0.0008% to about −0.0003%.

The average values C and D of the degrees of polarization for calculating the variation in values of degree of polarization may be calculated, for example, by averaging degrees of polarization that are measured at regular wavelength intervals of about 2 nm at wavelengths from 400 nm to 780 nm.

The term "degree of polarization" refers to a portion of an intensity of incident light that passes through a polarizing plate and is polarized, at a specified wavelength e.g. from 400 nm to 780 nm.

The variations in light transmittance and the degrees of polarization may be measured on a polarizing plate having a thickness of about 130 μm to about 200 μm. For example, when protective films are stacked on both sides of a polarizer, a polarizing plate may include a polarizer, a first protective film stacked on an upper side of the polarizer, and a second protective film stacked on a lower side of the polarizer and on an LCD panel. The polarizer may have a thickness of about 15 μm to about 30 μm. The first protective film may have a thickness of about 10 μm to about 100 μm. The second protective film may have a thickness of about 10 μm to about 100 μm. An adhesive layer may have a thickness of about 1 μm or less, for example, about 0.1 μm to about 1 μm.

A polarizing plate may include a polarizer and a protective film stacked on at least one side of the polarizer via an adhesive layer. FIG. 1 illustrates a polarizing plate according to one embodiment. Referring to FIG. 1, the polarizing plate may include a polarizer 1, a first protective film 2 stacked on an upper side of the polarizer 1 via a first adhesive layer 10a, and a second protective film 3 stacked on a lower side of the polarizer 1 via a second adhesive layer 10b.

The protective film may be stacked on the polarizer via the adhesive layers. The adhesive layer may be formed of a water-based adhesive including a polyvinyl alcohol resin, a zirconium compound, and an imine crosslinking agent.

The water-based adhesive may further contain an aqueous solvent such as water.

The water-based adhesive may have a viscosity from about 15 cP to about 25 cP at 25° C. Within this range, adhesion between the adhesive layer and the protective film or the polarizer may be maintained, separation therebetween may be reduced or prevented, and the polarizing plate may undergo reduced variation in light transmittance. Thereby, durability and resistance in hot and humid conditions may be improved. As an example, the viscosity may range from about 18 cP to about 22 cP at 25° C.

The polyvinyl alcohol resin may be a vinyl polymer resin that exhibits excellent adhesion with respect to a polarizer, e.g, polyvinyl alcohol polarizer. The polyvinyl alcohol resin may be an acetoacetyl group-containing polyvinyl alcohol resin, or a carboxyl group modified polyvinyl alcohol resin containing highly reactive functional groups, as examples.

A degree of polymerization and a degree of saponification of the polyvinyl alcohol resin may vary. For example, the polyvinyl alcohol resin may have an average degree of polymerization from about 100 to about 3000, and an average degree of saponification from about 85% to about 100% in terms of adhesion.

The polyvinyl alcohol resin may be contained in the form of a polyvinyl alcohol resin powder, as an example.

The polyvinyl alcohol resin may be present in an amount of about 1 part by weight to 10 parts by weight based on 100 parts by weight of an aqueous solvent in the water-based adhesive. Within this range, the adhesive may provide good adhesion while minimizing a variation in optical characteristics of the polarizing plate. For example, the polyvinyl alcohol resin may be present in an amount of about 2 parts by weight to about 4 parts by weight based on 100 parts by weight of water in the water-based adhesive.

The zirconium compound and the imine crosslinking agent may be contained in the water-based adhesive to improve adhesion with respect to the polarizer and to provide improved durability and water resistance of the adhesive.

The zirconium compound may be present in an amount of about 1 part by weight to about 40 parts by weight based on 100 parts by weight of the polyvinyl alcohol resin. Within this range, the polarizing plate may have a high durability due to reduced variation in light transmittance of the polarizing plate, and adhesion between the polarizer and the protective film may also be improved. As examples, the zirconium compound may be present in an amount of about 1 part by weight to about 20 parts by weight, or about 2 parts by weight to about 20 parts by weight, or about 2 parts by weight to about 9 parts by weight based on 100 parts by weight of the polyvinyl alcohol resin.

As examples, the zirconium compound may be present in an amount of about 0.01 wt % to about 1.0 wt %, or about 0.05 wt % to about 0.70 wt % in the water-based adhesive.

The zirconium compound may be a zirconium compound suitable for use as a crosslinking agent. As examples, the zirconium compound may include at least one selected from the group of zirconium oxide, ammonium zirconium carbonate, zirconium acetylacetonate, zirconium acetate, zirconium carbonate, zirconium sulfate, zirconium phosphate, potassium zirconium carbonate, zirconium sodium phosphate, sodium zirconium tartrate, zirconium nitrate, and chlorohydroxyoxozirconium. As an example, the zirconium compound may be zirconium oxide or a mixture containing the same.

The imine crosslinking agent may be present in an amount of about 10 parts by weight to about 50 parts by weight based on 100 parts by weight of the polyvinyl alcohol resin. Within this range, the polarizing plate may have a high durability due to reduced variation in light transmittance, and adhesion between the polarizer and the protective film may also be improved. As examples, the imine crosslinking agent may be present in an amount of about 20 parts by weight to about 40 parts by weight, or about 25 parts by weight to about 30 parts by weight based on 100 parts by weight of the polyvinyl alcohol resin.

The imine crosslinking agent may be an imine crosslinking agent suitable for use as a crosslinking agent. For example, the imine crosslinking agent may be polyethylene imine or a mixture containing the same.

The weight ratio of the zirconium compound to the imine crosslinking agent in the water-based adhesive may range from about 0.1 to about 1. Within this range, the polarizing plate may have a high durability due to reduced variation in light transmittance, and adhesion between the polarizer and the protective film may also be improved. As examples, the weight ratio may range from about 0.1 to 0.9, or about 0.1 to about 0.7.

The water-based adhesive may further include an additional crosslinking agent, in addition to the zirconium compound and the imine crosslinking agent. For example, the water-based adhesive may further include an organic crosslinking agent such as formaldehyde, glyoxal, glutaraldehyde, ethylene diamine, hexamethylene diamine, 1,3-bisaminocyclohexane, adipic acid hydrazide, carbonyl hydrazide, or the like. The water-based adhesive may further include an inorganic crosslinking agent, for example: a boron compound such as boric acid, boron, etc.; a titanium compound such as tetraalkoxy titanate, a water-soluble titanium compound, etc.; an aluminum compound such as aluminum sulfate, aluminum chloride, aluminum nitrate, etc.; a phosphoric compound such as phosphorous ester, etc.; or a silicone compound containing a reactive functional group such as an alkoxy group, a glycidyl group, etc. The crosslinking agent may be present in an amount of about 0.01 parts by weight to about 1 part by weight based on 100 parts by weight of the polyvinyl alcohol resin.

The pH of the water-based adhesive may be regulated using a strong acid such as nitric acid, hydrochloric acid, etc., and a weak acid such as acetic acid, etc.

The polarizer may be made of a suitable polyvinyl alcohol film. For example, the polarizer may be made of a partially formalized polyvinyl alcohol film, a modified polyvinyl alcohol film such as an acetoacetyl group-modified polyvinyl alcohol film, or the like.

The polyvinyl alcohol film may have a degree of polymerization from about 1,700 to about 4,000. Within this range, the polyvinyl alcohol film may be used as a polarization material and may provide satisfactory optical characteristics.

The polyvinyl alcohol film may have a degree of saponification of about 99% or more.

The polarizer may be manufactured by dyeing a polyvinyl alcohol film with iodine or a dichroic dye, followed by stretching the dyed polyvinyl alcohol film in a predetermined direction. For example, the polarizer may be manufactured by swelling, dyeing, and stretching.

The polarizer may have a thickness from about 15 μm to about 30 μm, as an example.

The protective film may be stacked on one or both sides of the polarizer. The protective film may be made of a material selected from the group of cellulose, polyester, cyclic polyolefin, polycarbonate, polyether sulfone, polysulfone, polyamide, polyimide, polyolefin, polyarylate, polyvinyl alcohol, polyvinyl chloride, polyvinylidene chloride, and mixtures thereof, as examples. For example, a polyester film made of polyethylene terephthalate (PET), a cyclic polyolefin films, or a cellulose film made of triacetylcellulose (TAC) may be used as the protective film.

The protective film may have a thickness of about 10 μm to about 100 μm, for example, about 30 μm to about 100 μm.

A functional film or a functional process may be applied to the protective film. For example, an anti-glare (AG) film or process, a hard coating film or process, or a glare-reducing film or process may be added.

When protective films are attached to both sides of a polarizer and include a first protective film attached to an upper side of the polarizer and a second protective film attached to a lower side of the polarizer, the first and second protective films may be the same or different in terms of material, thickness, and the like.

The polarizing plate may be fabricated using a polarizer, a protective film, and a water-based adhesive, by a conventional method. For example, the water-based adhesive may be applied on at least one side of the polarizer using an application method such as rolling, spraying, dipping, or the like. Then, with the adhesive applied to the polarizer, the polarizer and the protective film may be bonded to each other using, for example, a roll laminator, followed by drying, thereby fabricating the polarizing plate.

A hard coating layer, a pressure-sensitive adhesive layer, or the like may be further stacked on one side of the protective film to which the polarizer is not attached. The polarizing plate may be attached to a liquid crystal display panel via the pressure-sensitive adhesive layer.

Embodiments are also directed to a liquid crystal display that includes the polarizing plate.

In the liquid crystal display, the polarizing plate may be one or both of a front polarizing plate, which is placed on a front side of a liquid crystal display panel, and a rear polarizing plate, which is placed on a rear side of the liquid crystal display panel, that is, between a backlight unit and the liquid crystal panel.

EXAMPLES AND COMPARATIVE EXAMPLES

The following Examples and Comparative Examples are provided in order to highlight characteristics of one or more embodiments, but it is to be understood that the Examples and Comparative Examples are not to be construed as limiting the scope of the embodiments, nor are the Comparative Examples to be construed as being outside the scope of the embodiments. Further it is to be understood that the embodiments are not limited to the particular details described in the Examples and Comparative Examples Preparative Example A polyvinyl alcohol film (thickness: 75 μm, degree of polymerization: 2400, degree of saponification: 99% or more) was swollen in an aqueous solution at 25° C., and dyed in a dyeing solution at 30° C. in a dyeing bath. Then, the dyed polyvinyl alcohol film was additionally stretched in an aqueous boric acid solution at 55° C., thereby preparing a polyvinyl alcohol film with a final elongation 6 times an initial elongation thereof. Then, the polyvinyl alcohol film was dried in a chamber at 50° C. for 3 minutes, thereby preparing a 20 μm thick polarizer.

Specifications of the components used in examples and comparative examples were as follows.

For convenience of description, a protective film attached to an upper side of a polarizer is referred to as a "first protective film", and a protective film attached to a lower side of the polarizer and placed on a liquid crystal panel is referred to as a "second protective film".

(A) Polarizer: the polarizer manufactured according to the above preparative example was used;
(B) Protective film:
(b1) First protective film: AG TAC film (thickness: 80 μm, ASDS18BN, TOPPAN Co., Ltd.); and
(b2) Second protective film: TAC film (thickness: 60 μm, KC8UX2MW, TOPPAN Co., Ltd.); and
(C) Water-based adhesive:
(c1) Polyvinyl alcohol powder (Z-320, NIPPON SYNTHETIC IND.);
(c2) Polyethylene imine (NIPPON Shokubai); and
(c3) Zirconium compound: zirconium oxide (Nippon Rare Element Resources, Ltd.)

Examples 1-4

Water-based adhesives having compositions (by weight) as listed in Table 1 based on 100 parts by weight of water were prepared. Each of the water-based adhesives was applied to both sides of the polarizer prepared in the preparative example. The first protective film was stacked on upper side of the polarizer and the second protective film was stacked on lower side of the polarizer and bonded thereto using a roll laminator. The bonded resultants were cured for 1 hour at 85° C., thereby preparing polarizing plates.

Comparative Examples 1-2

The polarizing plates were prepared in the same manner as in Examples 1-4 except that the compositions (by weight) of the water-based adhesives were changed as listed in Table 1.

TABLE 1

|  | Example 1 | Example 2 | Example 3 | Example 4 | Comparative Example 1 | Comparative Example 2 |
|---|---|---|---|---|---|---|
| Polyvinyl Alcohol | 3.5 | 3.5 | 3.5 | 3.5 | 3.5 | 3.5 |
| Polyethylene imine | 1 | 1 | 1 | 1 | 1 | 1 |
| Zirconium compound | 0.1 | 0.3 | 0.5 | 0.7 | 0.03 | 3 |

Experimental Examples

Physical properties of the polarizing plates of the examples and comparative examples were evaluated and evaluation results are shown in Table 2.

(1) Variation in light transmittance after dipping test: Each of the polarizing plates (thickness: 162 μm, adhesive layer thickness: 1 μm) was attached to a non-alkali glass plate (2 cm×4 cm), and the prepared samples were held in a jig. Light transmittance values of each of the samples were measured at wavelength interval of 2 nm at a wavelength of 400 to 780 nm using a spectrophotometer (V-7100, Jasco Co., Ltd.), and the measured light transmittance values were averaged (value A). Then, the polarizing plate samples were dipped in water at about 25° C. for about 3 hours, followed by drying at about 25° C. for about 2 hours. Then, average values B of light transmittance were measured in the same manner. Finally, variation in light transmittance was calculated using |B−A|.

(2) Variation in degree of polarization after dipping test: Each of the polarizing plates (thickness: 162 μm, adhesive composition thickness: 1 μm) was attached to a non-alkali glass plate (2 cm×4 cm), and the prepared samples were held in a jig. The degrees of polarization of the samples were measured at wavelength intervals of 2 nm at a wavelength of 400 to 780 nm using a spectrophotometer (V-7100, Jasco Co., Ltd.), and the measured degrees of polarization were averaged (values C). Then, the polarizing plate samples were dipped in water of about 25° C. for about 3 hours, followed by drying at about 25° C. for about 2 hours. Then, the average value D of the degrees of polarization was measured in the same manner. Finally, variation in degree of polarization was calculated using D−C.

(3) Viscosity: The viscosity was measured as to 20 g of the water-based adhesives prepared in the examples and the comparative examples. 20 g of the water-based adhesives were left for aging for 1 hour at 25° C., and the viscosity thereof was measured at 25° C. using a viscometer (Brookfield DV-III).

TABLE 2

|  |  | Example 1 | Example 2 | Example 3 | Example 4 | Comparative Example 1 | Comparative Example 2 |
|---|---|---|---|---|---|---|---|
| Light Transmission (%) | Initial Value A (%) | 41.90 | 41.87 | 41.85 | 41.85 | 41.92 | 41.86 |
|  | Value B after dipping (%) | 41.90 | 42.02 | 42.05 | 42.06 | Impossible to measure | 42.24 |
|  | Variation \|B − A\| (%) | 0 | 0.15 | 0.20 | 0.21 | — | 0.38 |
| Degree of Polarization (%) | Initial value C (%) | 99.9975 | 99.9973 | 99.9969 | 99.9970 | 99.9971 | 99.9970 |
|  | Value D after dipping (%) | 99.9972 | 99.9968 | 99.9963 | 99.9962 | 99.9970 | 99.9960 |
|  | Variation D − C (%) | −0.0003 | −0.0005 | −0.0006 | −0.0008 | −0.0001 | −0.0010 |
| Viscosity (cP) |  | 18.5 | 19.5 | 20.8 | 21 | 10.0 | 22 |

As shown in Table 2, even after the dipping test, the polarizing plates of the examples exhibited reduced variation in light transmittance and degree of polarization, thereby providing high humidity heat resistance. Further, the polarizing plates of the examples maintained high adhesion.

By way of summation and review, in some applications such as LCD monitors and LCD televisions, a backlight unit having high brightness may be used. Accordingly, it is desirable that a polarizing plate have improved performance.

Generally, a polarizing plate includes a polarizer and protective films attached to both sides of the polarizer. The polarizer may be formed of a polyvinyl alcohol film. The polyvinyl alcohol film may be hydrophilic, whereas the protective film may be hydrophobic. Thus, when a water-based adhesive is used to attach the protective film to the polarizer, it is desirable for the adhesive to exhibit good adhesion with respect to both the polarizer and the protective film.

Polyvinyl alcohol films may exhibit high hygroscopicity. Thus, an adhesive layer formed of such water-based adhesives may be easily deformed by the polyvinyl alcohol film, thereby causing deterioration in optical characteristics, such as light transmittance and degree of polarization, and humid heat resistance. Moreover, a water-based adhesive may contain zirconium. However, an excessive amount of zirconium in the adhesive may cause red discoloration of the polarizing plate.

In contrast, a polarizing plate according to embodiments has less change in optical characteristics including light transmittance and/or degree of polarization, thereby providing high durability and resistance and improved adhesion in heat and humid conditions. An LCD includes the polarizing plate.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. A polarizing plate, comprising:
a polarizer; and
a protective film attached to at least one side of the polarizer via an adhesive layer, the adhesive layer being formed of a water-based adhesive including a polyvinyl alcohol resin, a zirconium compound present in an amount of about 1 part by weight to about 40 parts by weight based on 100 parts by weight of the polyvinyl alcohol resin, and an imine crosslinking agent present in an amount of about 10 parts by weight to about 50 parts by weight based on 100 parts by weight of the polyvinyl alcohol resin, wherein a weight ratio of the zirconium compound to the imine crosslinking agent in the water-based adhesive ranges from about 0.1 to about 0.7,
the polarizing plate having a variation in light transmittance (|B−A|) from 0% to about 0.25% at wavelengths from 400 nm to 780 nm, where A is an average value of initial light transmittance of the polarizing plate at wavelengths from 400 nm to 780 nm, and B is an average value of light transmittance of the polarizing plate at wavelengths from 400 nm to 780 nm measured after the polarizing plate has been dipped in water of 25° C. for 3 hours, followed by drying at 25° C. for 2 hours; and a variation in a degree of polarization (D−C) from more than about −0.001% to about 0% at wavelengths from 400 nm to 780 nm, where C is an average value of initial degrees of polarization of the polarizing plate at wavelengths from 400 nm to 780 nm, and D is an average value of degrees of polarization of the polarizing plate at wavelengths from 400 nm to 780 nm measured after the polarizing plate has been dipped in water of 25° C. for 3 hours, followed by drying at 25° C. for 2 hours.

2. The polarizing plate as claimed in claim 1, wherein the water-based adhesive has a viscosity of about 15 cP to about 25 cP at 25° C.

3. The polarizing plate as claimed in claim 1, wherein the zirconium compound includes at least one selected from the group of zirconium oxide, ammonium zirconium carbonate, zirconium acetylacetonate, zirconium acetate, zirconium carbonate, zirconium sulfate, zirconium phosphate, potassium zirconium carbonate, zirconium sodium phosphate, sodium zirconium tartrate, zirconium nitrate, and chlorohydroxyoxozirconium.

4. The polarizing plate as claimed in claim 1, wherein the imine crosslinking agent is polyethylene imine.

5. The polarizing plate as claimed in claim 1, wherein the polyvinyl alcohol resin is present in the water-based adhesive in an amount of about 1 part by weight to about 10 parts by weight based on 100 parts by weight of water in the water-based adhesive.

6. The polarizing plate as claimed in claim 1, wherein the protective film includes at least one selected from the group of cellulose, polyester, cyclic polyolefin, polycarbonate, polyethersulfone, polysulfone, polyamide, polyimide, polyolefin, polyarylate, polyvinyl alcohol, polyvinyl chloride, and polyvinylidene chloride.

7. The polarizing plate as claimed in claim 1, wherein:
the polarizer has a thickness of about 15 μm to about 30 μm,
the protective film has a thickness of about 10 μm to about 100 μm, and
the adhesive layer has a thickness of about 1 μm or less.

8. A liquid crystal display comprising the polarizing plate according to claim 1.

* * * * *